US010571687B2

(12) United States Patent
Johnson (10) Patent No.: US 10,571,687 B2
(45) Date of Patent: Feb. 25, 2020

(54) IMAGING SYSTEMS AND METHODS

(71) Applicant: Goodrich Corporation, Charlotte, NC (US)

(72) Inventor: James B. Johnson, Reading, MA (US)

(73) Assignee: Goodrich Corporation, Charlotte, NC (US)

(\*) Notice: Subject to any disclaimer, the term of this patent is extended or adjusted under 35 U.S.C. 154(b) by 0 days.

(21) Appl. No.: 15/888,840

(22) Filed: Feb. 5, 2018

(65) Prior Publication Data

US 2019/0243128 A1 Aug. 8, 2019

(51) Int. Cl.
| G02B 26/10 | (2006.01) |
| G02B 26/08 | (2006.01) |
| G01S 7/481 | (2006.01) |
| G02B 5/04 | (2006.01) |
| G02B 7/18 | (2006.01) |
| G02B 27/00 | (2006.01) |
| G01S 17/93 | (2020.01) |
| G01S 17/89 | (2020.01) |

(52) U.S. Cl.
CPC .......... G02B 26/108 (2013.01); G01S 7/4813 (2013.01); G01S 7/4817 (2013.01); G01S 17/89 (2013.01); G01S 17/93 (2013.01); G02B 5/04 (2013.01); G02B 7/1805 (2013.01); G02B 26/0891 (2013.01); G02B 27/0081 (2013.01)

(58) Field of Classification Search
CPC ......... H01J 31/26; H31J 31/507; G01S 17/89; G01S 17/66; G01S 17/4816; G01S 17/4813; G01S 17/4815; G01S 17/88; G01S 17/93; G01S 7/4817; G01S 7/4813; G05D 1/0676; G02B 26/108; G02B 26/0891; G02B 5/04; G02B 27/0081; G02B 7/1805
See application file for complete search history.

(56) References Cited

U.S. PATENT DOCUMENTS 4,131,022 A \* 12/1978 Mezrich .................. A61B 8/00
128/916
4,950,056 A \* 8/1990 Smith ................ G02B 17/0808
359/211.2

(Continued)

FOREIGN PATENT DOCUMENTS

| DE | 3105018 A1 | 9/1982 |
| EP | 2040106 A2 | 3/2009 |

OTHER PUBLICATIONS

Extended European Search Report for European Patent Application No. EP19155342.9, dated Jun. 25, 2019.

(Continued)

*Primary Examiner* — Sang H Nguyen
(74) *Attorney, Agent, or Firm* — Locke Lord LLP; Scott D. Wofsy; Judy R. Naamat (57) ABSTRACT

An imaging system includes a first risley sensor pointed along a first axis and a second risley sensor pointed along a second axis, the second axis intersecting the first axis, the second risley sensor has at least a wide field of view and a narrow field of view. A controller is operably connected to the second risley sensor and configured to select one of the wide field of view and the narrow field of view for image data acquired by the second risley sensor. Vehicles including the imaging system and imaging methods are also described.

20 Claims, 5 Drawing Sheets

(56) References Cited

U.S. PATENT DOCUMENTS

| | | | | |
|---|---|---|---|---|
| 5,278,402 | A * | 1/1994 | Wein | G01N 21/41 250/201.9 |
| 5,321,259 | A * | 6/1994 | Morgan | B23K 9/1274 250/236 |
| 6,359,681 | B1 * | 3/2002 | Housand | G01S 7/481 356/4.01 |
| 6,549,700 | B1 * | 4/2003 | Sweatt | G02B 6/3524 385/16 |
| 9,164,269 | B1 | 10/2015 | Jahromi | |
| 9,244,270 | B1 * | 1/2016 | Sherman | G02B 3/0062 |
| 9,791,555 | B2 | 10/2017 | Zhu | |
| 2004/0057656 | A1 * | 3/2004 | Chu | G02B 6/3524 385/17 |
| 2006/0232828 | A1 * | 10/2006 | Salmon | G01S 3/789 358/448 |
| 2008/0002863 | A1 * | 1/2008 | Northcott | G06K 9/00604 382/117 |
| 2010/0027089 | A1 * | 2/2010 | Nilsson | G01S 7/4817 359/201.1 |
| 2011/0285981 | A1 * | 11/2011 | Justice | G01S 7/4813 356/4.01 |
| 2012/0111992 | A1 * | 5/2012 | Fry | F41G 7/2253 244/3.16 |
| 2012/0170029 | A1 * | 7/2012 | Azzazy | H01J 31/26 356/139.04 |
| 2013/0101276 | A1 | 4/2013 | Keller et al. | |
| 2015/0029571 | A1 * | 1/2015 | Steele | G02B 26/0883 359/211.2 |
| 2017/0146639 | A1 | 5/2017 | Carothers | |
| 2017/0160541 | A1 | 6/2017 | Carothers et al. | |
| 2017/0176990 | A1 * | 6/2017 | Keller | G01S 17/42 |
| 2017/0250763 | A1 * | 8/2017 | Zinchenko | H04B 17/23 |
| 2017/0350763 | A1 * | 12/2017 | Shafer | G01J 3/021 |

OTHER PUBLICATIONS

Marshall, G.F., "Risley Prism Scan Patterns", Visual Communications and Image Processing; 20-1-2004-20-1-2004; San Jose vol. 3787, Jul. 21, 1999 (Jul. 21, 1999), pp. 74-86, XP001105617, DOI: 10.1117/12.351658 ISBN: 978-1-62841-730-2.

* cited by examiner

2 Sensor Pattern With
Narrow and Wide Scan Combined

FIG. 6

2 Sensor Pattern With both
performing Narrow Scan

FIG. 7

IMAGING SYSTEMS AND METHODS

BACKGROUND OF THE INVENTION

1. Field of the Invention

The present disclosure relates to imaging, and more particularly to imaging systems and methods employing risley scanners with overlapping fields of view.

2. Description of Related Art

Vehicles, such as aircraft, commonly employ imaging systems to provide input to the crew and/or various vehicle controllers. The input provides situational awareness of the area covered by the imaging system, allowing the vehicle to negotiate obstacles within the area covered by the imaging system. In some imaging systems risley scanners are employed.

Risley scanners employ rotating prisms with wedge angles to convey light from the environment to a detector. The distribution of light conveyed by the prisms depends on the prism wedge angles and the speed and direction of rotation. For imagers covering wide angle scan with a wide angle area image the distribution of light can be non-uniform. For example, light (and information conveyed by the light) conveyed to the scanner can have a non-uniform pattern having gaps within coverage (or field of regard) of the scanner. The non-uniformity can be compounded when the field of view of the imager is complex (e.g., not square). The non-uniformity can be improved by reducing size of the scanner field of regard or using multiple scanners. Limiting coverage of the given scanner limits the situational awareness provided by the scanner. Use of multiple scanners requires control logic to manage whether the multiple scanners both image a common scene or portions of the scene.

Such conventional methods and systems have generally been considered satisfactory for their intended purpose. However, there is still a need in the art for improved imaging methods and systems. The present disclosure provides a solution for this need.

SUMMARY OF THE INVENTION

An imaging system includes a first risley sensor pointed along a first axis and a second risley sensor pointed along a second axis, the second axis intersecting the first axis, the second risley sensor has at least a wide field of view and a narrow field of view. A controller is operably connected to the second risley sensor and configured to select one of the wide field and the narrow field to adjust uniformity in a combined image acquired by the first and second risley sensors.

In certain embodiments the first and second axes intersect in a direction of vehicle travel. The first risley sensor and the second risley sensor can be identical to one another. The first risley sensor can include first and second prisms with wedge angles arranged along the first axis. The wedge angle of the first prism being different than the wedge angle of the second prism. The second risley sensor can include first and second prisms with wedge angles arranged along the second axis. The wedge angles of the second risley sensor prisms being identical to the wedge angles of the first risley sensor prisms.

In accordance with certain embodiments the first risley sensor can be configured to acquire image data having first elliptical pattern. The second risley scanner can be configured to acquire image data having a second elliptical pattern. The second elliptical pattern being identical to the first elliptical pattern. The second elliptical pattern can be different that the first pattern. The controller can have a combiner module configured to combine image data from the first and second risley scanners and construct a single image from the combined image data.

It is also contemplated that, in accordance with certain embodiments, the controller can have a drive module. The drive module can be configured to change rotational speed of a prism supported for rotation about the second axis. The drive module can be configured to reverse rotational speed of a prism supported for rotation about the second axis. The controller can have an input module. The input module can be configured to receive a wide field/narrow field selection input. At least one of the first and second risley sensors can include a LIDAR system.

An imaging method includes, at an imaging system as described above selecting one of the wide field and the narrow field using the controller. Uniformity is adjusted in a combined image acquired by the first and second risley sensors with image data collected using the selected field of view.

In certain embodiments the method can include changing rotational speed of a prism supported for rotation about the second axis. The method can include reversing rotational speed of a prism supported for rotation about the second axis. The method can include acquiring image data having first elliptical pattern. The method can include acquiring image data with a second elliptical pattern, the first elliptical pattern being identical to or different from the first elliptical pattern. A wide field/narrow field selection input can be received. Image data from the first and second risley scanners can be combined and a single image constructed from the combined image data from the first and second risley sensors.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION OF THE PREFERRED EMBODIMENTS

Figure 1:
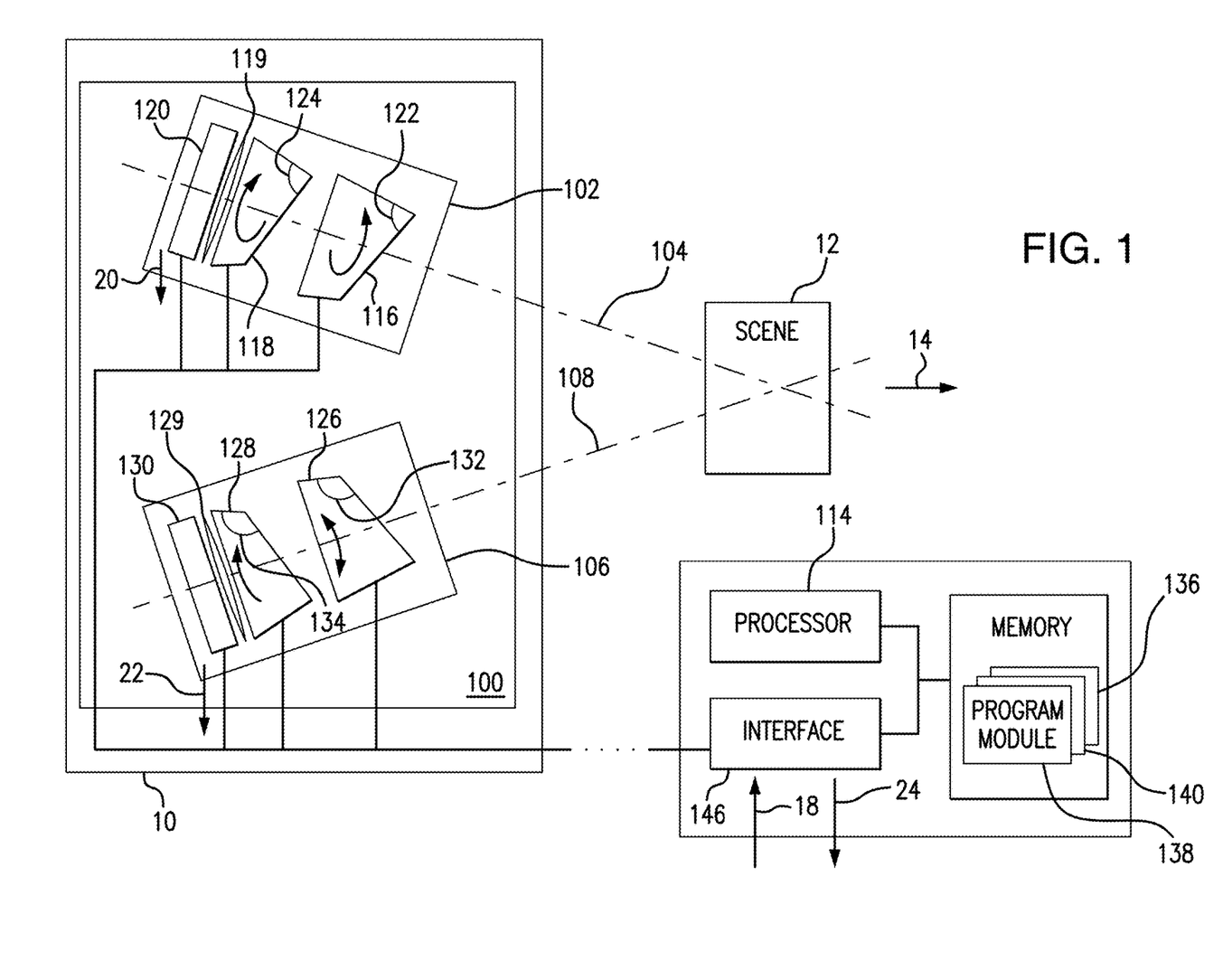
FIGS. 1 and 2 are schematic views of an exemplary embodiments of imaging systems constructed in accordance with the present disclosure, showing sensors of passive and active imaging systems pointed in common direction for imaging a scene, respectively.

Reference will now be made to the drawings wherein like reference numerals identify similar structural features or aspects of the subject disclosure. For purposes of explanation and illustration, and not limitation, a partial view of an exemplary embodiment of an imaging system in accordance with the disclosure is shown in FIG. 1 and is designated generally by reference character 100. Other embodiments of imaging systems, vehicles with imaging systems, and imaging methods in accordance with the disclosure, or aspects thereof, are provided in FIGS. 2-7, as will be described. The systems and methods described herein can be used imaging a scene using dual sensor imaging systems, such as in autonomous vehicle navigation, though the present disclosure is not limited to autonomous vehicle navigation or to vehicle navigation in general.

With reference to FIG. 1, a vehicle 10 is shown. Vehicle 10 includes imaging system 100. Imaging system 100 is a passive imaging system and includes a first risley sensor 102 and a second risley sensor 106. First risley sensor 102 is pointed along a first axis 104 and second risley sensor 106 is pointed along a second axis 108, second axis 108 intersecting first axis 104. Second risley sensor 106 has a wide field of view 110 (shown in FIG. 3) and a narrow field of view 112 (shown in FIG. 4), which is selectable according imaging requirements. A controller 114 is operably connected to first risley sensor 102 and second risley sensor 106 to select one of wide field of view 110 and narrow field of view 112 for acquiring image data from first risley sensor 102 and second risley sensor 106 for aggregation into a single image according to the imaging requirements.

A scene of interest 12 is arranged along both first axis 104 and second axis 108. First axis 104 and second axis 108 intersect one another at infinity, the field of view of first risley sensor 102 being registered to second risley sensor 106 at common infinity boresight. In the illustrated exemplary embodiment first axis 104 and second axis 108 intersect one another in a direction of vehicle travel 14, imaging system 100 thereby providing sensing capability in the direction of vehicle travel 14, sensing capability peripherally about the direction of vehicle travel 14, and enhanced sensing capability in either the direction of vehicle travel 14 or peripherally about the direction of vehicle travel 14.

First risley sensor 102 includes a first prism 116, a second prism 118, an optical element 119 (e.g., imaging optics), and a focal plane array (FPA) 120. First prism 116, second prism 118, optical element 119 and FPA 120 are each arranged along first axis 104. First prism 116 optically couples second prism 118 to scene 12. Second prism 118 optically couples optical element 119 to first prism 116. Optical element 119 optically couples FPA to second prism 118, FPA 120 thereby being optically coupled to scene 12 by first prism 116, second prism 118, and optical element 119. First prism 116 and second prism 118 each have a wedge angle, a wedge angle 122 of first prism 116 being different than a wedge angle 124 of second prism 118, and are each supported for rotation about first axis 104. FPA 120 is configured to generate image data 20. The different wedge shape of first prism 116 and second prism 118 provide an elliptical pattern to image data 20, the shape of the elliptical pattern selectable by selection or prism rotation. Optical element 119 is configured to collect electromagnetic radiation provided to it by first prism 116 and second prism 118 and to distribute the electromagnetic radiation to an active area of FPA 120.

Second risley sensor 106 is similar to first risley sensor 102 and is additionally arranged along second axis 108. Second risley sensor 106 includes a first prism 126, a second prism 128, an optical element 129 (e.g., imaging optics), and an FPA 130. First prism 126, second prism 128, optical element 129, and FPA 130 are each arranged along second axis 108. First prism 126 optically couples second prism 128 to scene 12. Second prism 128 optically couples optical element 129 to first prism 126. Optical element 129 optically couples second prism 128 to FPA 130, FPA 130 thereby being optically coupled to scene 12 through optical element 129, first prism 126, and second prism 128. Second risley sensor 106 first prism 126 and second prism 128 each have a wedge angle, a wedge angle 132 of first prism 126 being different than a wedge angle 134 of second prism 128, and are supported for rotation about first axis 104. In certain embodiments second prism wedge angle 134 of second risley sensor 106 can be identical to second prism wedge angle 124 of first risley sensor first prism and first prism wedge angle 132 can be identical to first risley scanner first prism wedge angle 122. In accordance with certain embodiments second risley sensor 106 can be identical to first risley sensor 102.

Figure 2:
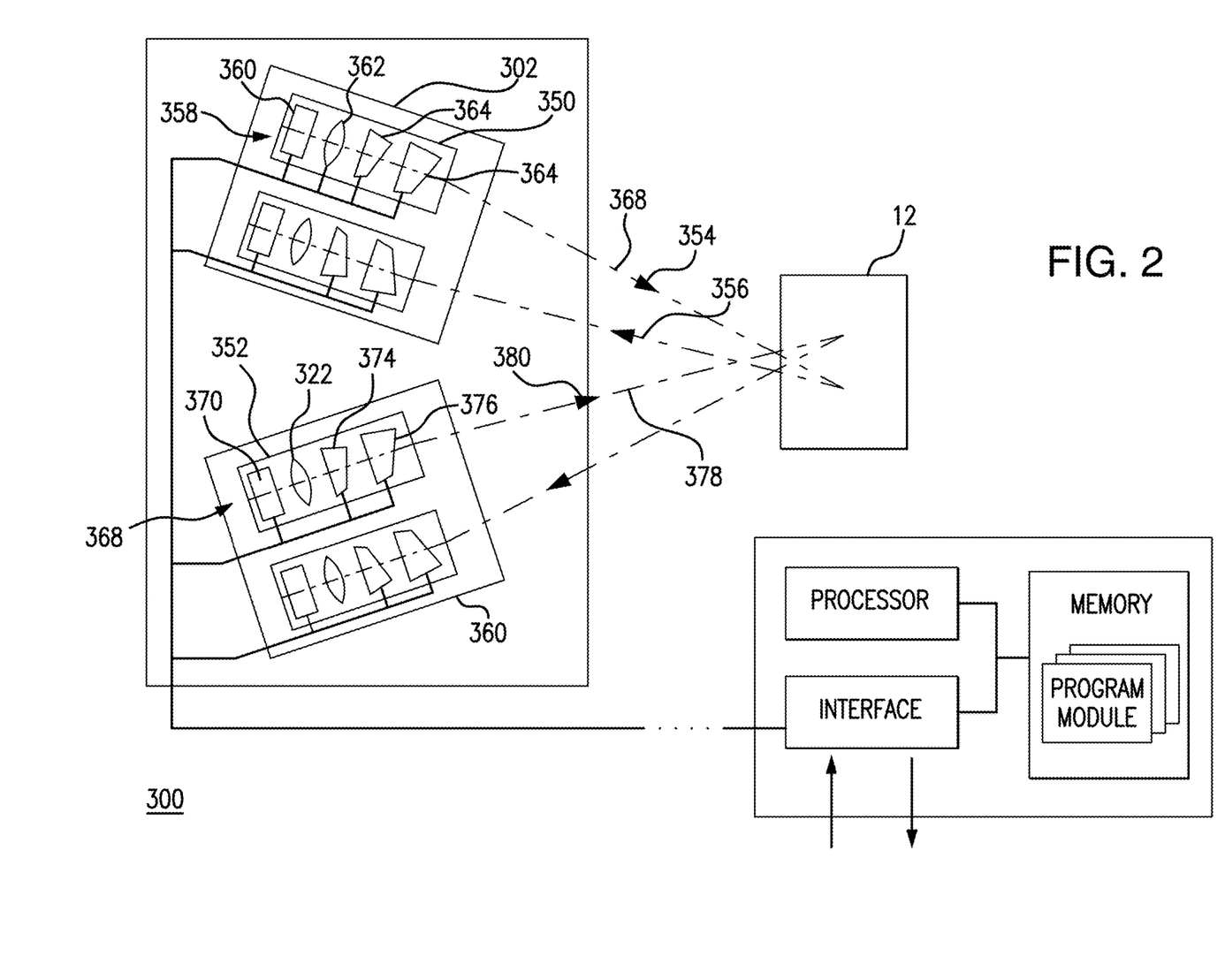

Referring to FIG. 2, an imaging system 300 is shown. Imaging system 300 is similar to imaging system 100 (shown in FIG. 1) and is additionally configured as an active imaging system. In this respect imaging system 300 includes a first illuminator 350 and second illuminator 352. First illuminator 350 is incorporated in first risley sensor 302 and is arranged to direct illumination 354 toward scene 12, which scene 12 reflects back to first risley sensor 302 as reflected illumination 356 having information regarding scene 12. Second illuminator 352 is incorporated in second risley sensor 306 and is similarly arranged to direct illumination 366 toward scene 12, which scene 12 reflects back to second risley sensor 306.

In certain embodiments first illuminator 350 includes a LIDAR (i.e., Lidar, LiDAR, or LADAR) system 358. LIDAR system 358 includes a laser 360. Laser 360 is optically coupled to an optical element 362, a second prism 364, and first prism 366, each of which are arranged along an illuminator axis 368 intersecting scene 12 for directing laser illumination 354 toward scene 12. As will be appreciated by those of skill in the art, LIDAR system 358 can improve imaging performance of imaging system 300 when ambient illumination is reduced, such as at nighttime, in bad weather, or in dusty conditions.

In accordance with certain embodiments second illuminator 352 can include a LIDAR system 368. LIDAR system 368 includes a laser 370 that is optically coupled to an optical element 372, a second prism 374, and first prism 376. Optical element 372, a second prism 374, and first prism 376 are each arranged along an illuminator axis 378 intersecting scene 12 for directing laser illumination 380 toward scene 12. As will also be appreciated by those of skill in the art, inclusion of LIDAR system 368 in second illuminator 352 can further improve imaging performance of imaging system 300 when ambient illumination is reduced, such as at nighttime, in bad weather, or in dusty conditions.

Figure 3:
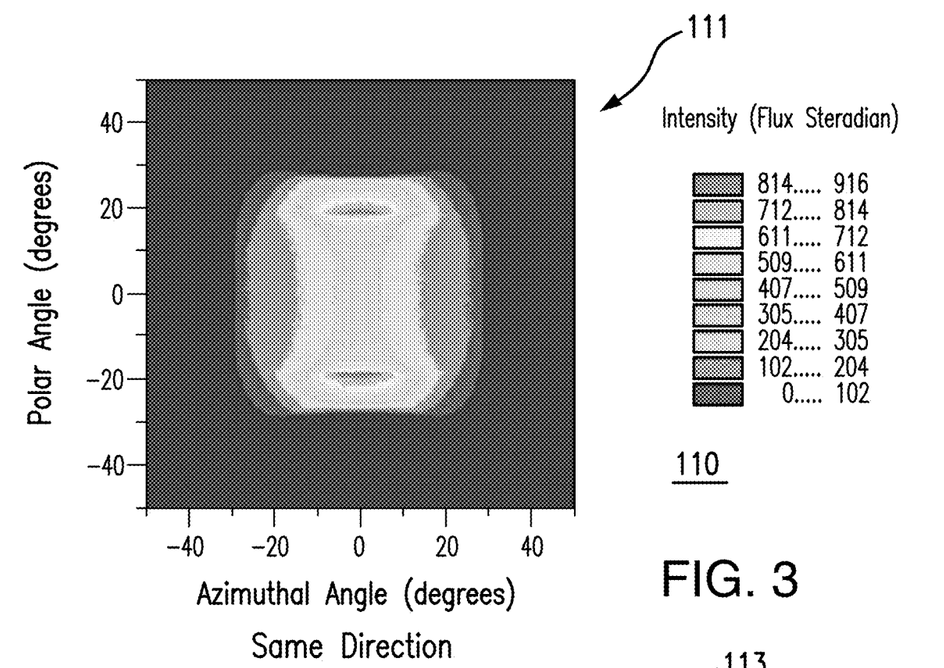
FIG. 3 is an intensity map of image data acquired from a single risley sensor of the imaging sensor of FIG. 1 or FIG. 2, showing wide field image data acquired when prisms of the single risley scanner rotate in a common direction.
Figure 4:
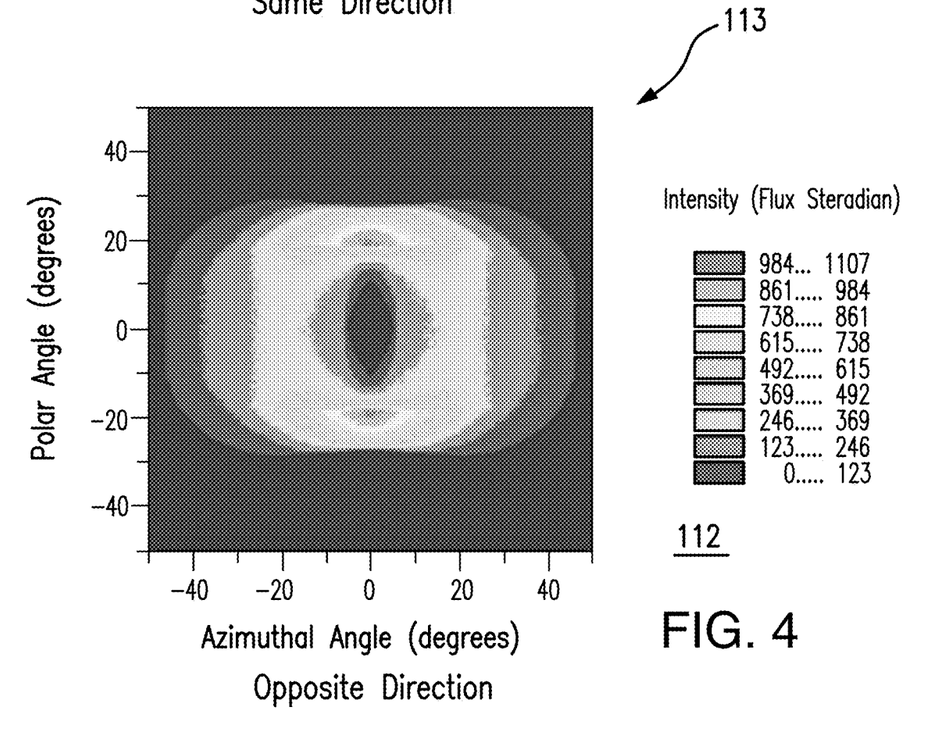
FIG. 4 is an intensity map of image data acquired from a single risley sensor of the imaging sensor of FIG. 1 or FIG. 2, showing narrow field image data acquired when prisms of the single risley scanner rotate in opposed directions.

With reference to FIGS. 3 and 4, exemplary alternative elliptical patterns of image data 20 and image data 22 collected by first risley sensor 102 and second risley sensor 106 are shown. Referring to FIG. 3, a wide field of view 110 is shown. Wide field of view 110 has a generally elliptical pattern 111 with a major axis oriented horizontally relative to FIG. 2 generated when the prisms of a risley sensor of imaging system 100 (shown in FIG. 1), e.g., first prism 116 (shown in FIG. 1) and second prism 118 (shown in FIG. 1), rotate in a common direction. The generally elliptical pattern of wide field of view 110 has an azimuthal angle, shown on the x-axis, that is greater than a polar angle, shown on the y-axis, of image data collected with wide field of view 110.

As shown in FIG. 3, wide field of view 110 also has a cross-field uniformity characteristic where the central region of the image data has relatively low intensity or no intensity (and therefore relatively little information) while a peripheral region of the image data, extending peripherally about the central region, has relatively high intensity. As will be appreciated by those of skill in the art, images reconstructed using wide field image data have relatively little information (low signal content) in the central region of the images and relative large amounts of information in the peripheral region of the images (high signal content). As a consequence, image data acquired with a wide field elliptical pattern can provide good situational awareness but can be less useful for navigation, where information about potential obstacles located in the direction of vehicle travel 14 (shown in FIG. 1) is more important.

Referring to FIG. 4, a narrow field of view 112 is shown. Narrow field of view 112 has a generally elliptical pattern 113 with a major axis oriented vertically relative to FIG. 3. A risley sensor of imaging system 100 (shown in FIG. 1) generates image data with narrow field of view 112 when prisms of a risley sensor, e.g., first prism 126 (shown in FIG. 1) and second prism 128 (shown in FIG. 1), rotate in opposed directions. Narrow field of view 112 has an azimuth angle that is smaller than a polar angle of the image data. Narrow field of view 112 also has a cross-field uniformity characteristic wherein the central region of the image data has relatively high intensity (and therefore more information) than the peripheral region of the image data. As will also be appreciated by those of skill in the art, images reconstructed using narrow field image data has greater amounts of information, and therefore higher resolution, in the central region of the images and smaller amounts of information in the peripheral region of the image data, where resolution is therefore smaller. As a consequence, image data acquired with narrow field of view 112 can provide good about potential obstacles located in the direction of vehicle travel 14 (shown in FIG. 1), but is less useful for situational awareness, where peripheral information is more important.

Figure 5:
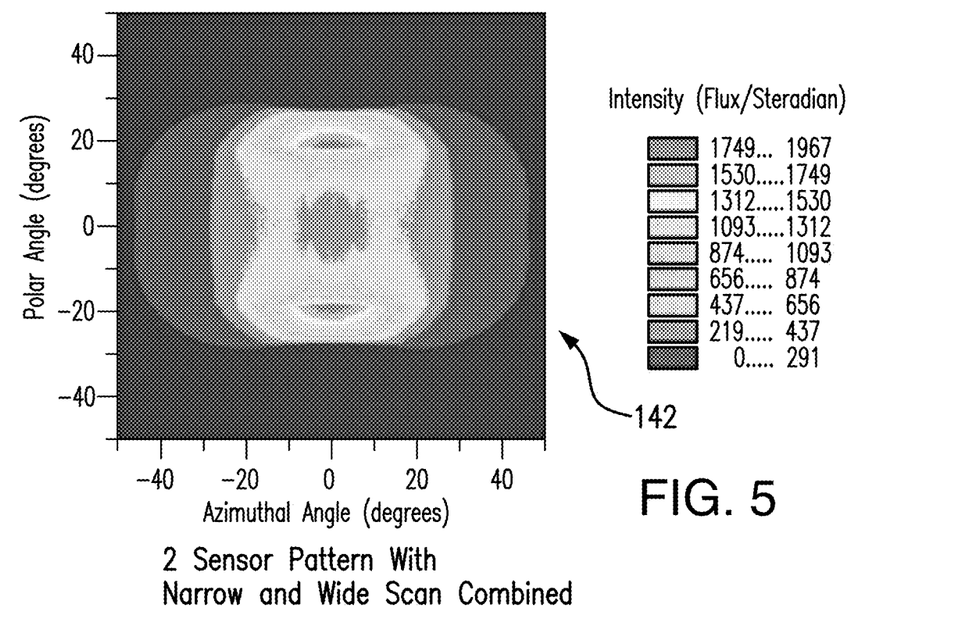
FIG. 5 is an intensity map of aggregated image data acquired from both risley sensors of the imaging sensor of FIG. 1 or FIG. 2, showing narrow field image data from the first risley sensor aggregated with wide field image data from the second risley scanner.
Figure 6:
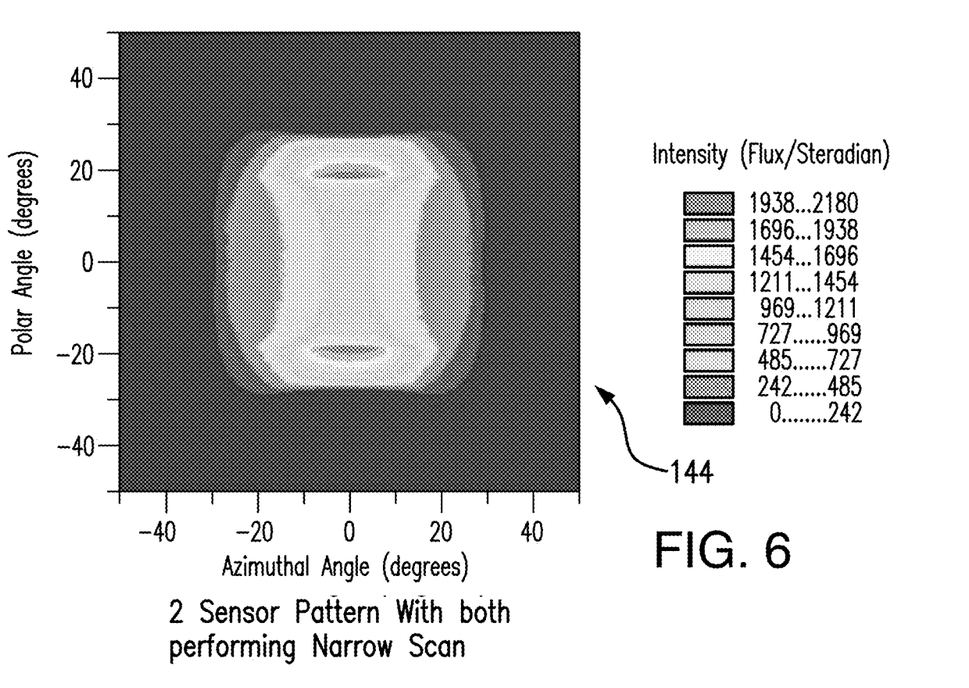
FIG. 6 is an intensity map of aggregated image data acquired from both risley sensors of the imaging sensor of FIG. 1 or FIG. 2, showing narrow field image data from the first risley sensor aggregated with narrow field image data from the second risley scanner.

With reference to FIGS. 5 and 6, aggregated image data acquired from both risley sensors of imaging system 100 are shown. Applicants have come to appreciate that aggregating image data 20 (shown in FIG. 1) and image data 22 (shown in FIG. 1) from first risley sensor 102 (shown in FIG. 1) and second risley sensor 106 (shown in FIG. 1), bore sighted to a common point at infinity, can simplify the need for multiple sensor configurations. In particular, since the primes speed and position can be controlled with software, either (or both) first risley sensor 102 and second risley sensor 106 can be set to rotate in a selected direction to create a desired pattern in the image data collected by the respective risley sensor.

For example, when one risley sensor is configured to collect wide field image data, and the other to collect narrow field image data, the aggregated image data has better uniformity across both the azimuthal angle and the polar angle. Stated differently, the total indicated range (TIR) of the cross field intensity can be made smaller for a given imaging condition. This is shown in FIG. 5, where a two-sensor pattern 142 resulting from aggregated narrow field image data from both first risley sensor 102 and second risley sensor 106 are shown.

When both risley sensors are configured to collect image data with narrow field of view 112 (shown in FIG. 4), resolution in the central region of the image data is enhanced. This enhances resolution in the direction of flight, and in the case of degraded visual environments, can double the sensing capabilities of imaging system 100 (shown in FIG. 1). This is shown in FIG. 6, where a two-sensor pattern 144 resulting from aggregated narrow field image data from both first risley sensor 102 and second risley sensor 106 are shown. Notably, the central region of two-sensor pattern 144 is has relatively high intensity relative to the periphery of the central region—indicating that more information is present in the central region relative to the periphery about the central region of two-sensor pattern 144.

As will be appreciated by those of skill in the art in view of the present disclosure, the converse also holds true. More specifically, when both risley sensors of imaging system 100 with a wide field of view, e.g., wide field of view 110 (shown in FIG. 3), a two-sensor pattern is created that has relatively high intensity in the peripheral region extending about the central region of the two-sensor pattern. This can be advantageous in certain circumstances where peripheral information of temporally more important than that of the direction of flight, such as when landing a rotorcraft in brownout imaging conditions.

With continuing reference to FIGS. 1 and 2, controller 114 is configured and adapted to enable selection the field of view of one (or both) of first risley sensor 102 and second risley sensor 106. In this respect controller 114 has an input module 136, a drive module 138, and an aggregator module 140. Input module 136 is configured to receive a wide field/narrow field input 18 through an interface 146. Wide field/narrow field input 18 specifies whether image data 20 and image data 22 are to be provided aggregator module 140 as a wide field image data/narrow field image data set, a narrow field image data/narrow field image data set, or a wide field image data/wide field image data set, and thereafter provided as an output 24. It is contemplated that wide field/narrow field input 18 can be provided by a user, a vehicle flight control system, or remotely, as suitable for an intended application, and that output 24 can similarly be provided to a user, a vehicle flight control system, or remotely, as suitable for an intended application.

Drive module 138 is operably connected to the prisms of first risley sensor 102 and second risley sensor 106 for controlling the rotation direction of at least one prism in at least one of the risley sensors. In this respect drive module 138 is configured to change rotational direction, i.e., by reversing rotational direction of at least first prism 126 of second risley sensor 106 relative to second prism 128 of first risley sensor 102, thereby changing the elliptical pattern of image data 22 between wide field of view 110 (shown in FIG. 3) and narrow field of view 112 (shown in FIG. 4). In certain embodiments drive module 138 is configured to change rotational direction of first prism 116 of first risley sensor 102 relative to second prism 118 of first risley sensor 102, thereby also changing the elliptical pattern of image data 20 (shown in FIG. 1) between wide field of view 110 and narrow field of view 112.

Aggregator module 140 is configured and adapted to receive image data 20 and image data 22 and aggregate each with the other. In certain embodiments aggregator module 140 is also configured to construct an image using the aggregated image, which can be communicated to a user interface or communicated to a remote device, as suitable for an intended application.

Figure 7:
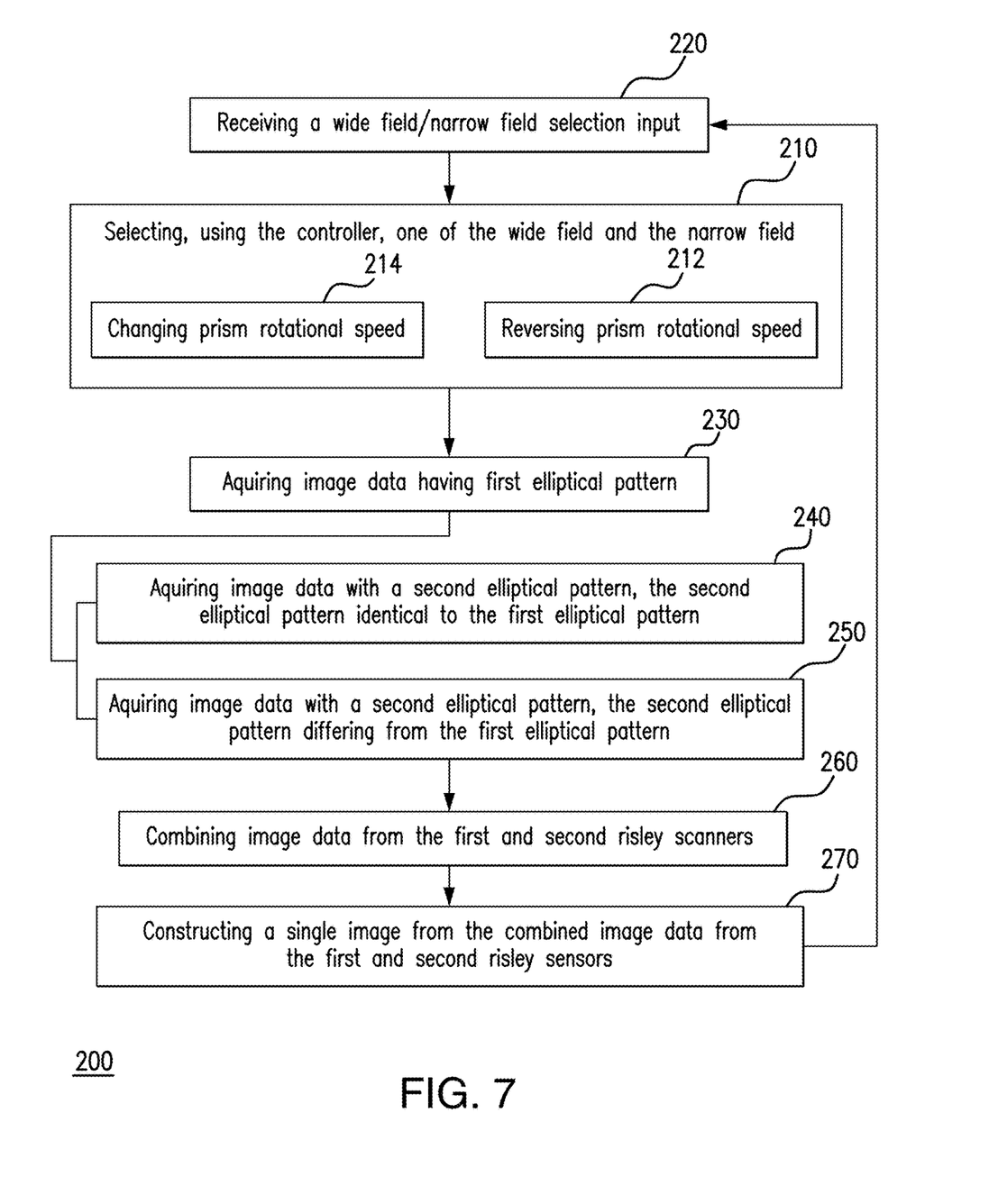
FIG. 7 is a flow chart of an exemplary imaging method, showing steps of the method according to an exemplary imaging method.

Referring to FIG. 7, imaging method 200 is shown. Method 200 includes selecting one of a wide field of view, e.g., wide field of view 110 (shown in FIG. 3) and a narrow field of view, e.g., narrow field of view 112 (shown in FIG. 4), as shown in box 210. It is contemplated that the selection be accomplished using a controller, e.g., controller 114 (shown in FIG. 1).

In certain embodiments selecting one of the wide field of view and the narrow field of view can include reversing direction of rotation of a prism of a risley sensor, e.g., first prism 126 (shown in FIG. 1), as shown with box 212. Selecting one of the wide field of view and the narrow field of view can include changing rotational speed of the of the prism, as shown with box 214. It is also contemplated selecting one of the wide field of view and the narrow field of view can include receiving a wide field of view/narrow field of view selection input, as shown in box 220.

In accordance with certain embodiment, method 200 can include acquiring image data, e.g., image data 20 (shown in FIG. 1), with an elliptical pattern, e.g., elliptical pattern 111 (shown in FIG. 3), as shown with box 230. It is contemplated that method 200 can include acquiring image data with a second elliptical pattern, e.g., elliptical pattern 113 (shown in FIG. 4), the second elliptical pattern being identical to the first elliptical pattern, as shown with box 240 or the second elliptical pattern being different to the first elliptical pattern, as shown with box 250. Once acquired the image data is aggregated, as shown with box 260, and a single image constructed using the image data from the first and second risley sensors, as shown with box 270.

As will be appreciated by those skilled in the art, aspects of the present disclosure may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Controller 114 (shown in FIGS. 1 and 2) is intended to provide a brief, general description of an illustrative and/or suitable exemplary environment in which embodiments of the above described present invention may be implemented. FIGS. 1 and 2 are exemplary of a suitable environment and is not intended to suggest any limitation as to the structure, scope of use, or functionality of an embodiment of the present invention. A particular environment should not be interpreted as having any dependency or requirement relating to any one or combination of components illustrated in an exemplary operating environment. For example, in certain instances, one or more elements of an environment may be deemed not necessary and omitted. In other instances, one or more other elements may be deemed necessary and added.

The methods and systems of the present disclosure, as described above and shown in the drawings, provide for imaging systems with superior properties including simplified multi-sensor systems and the capability to tailor imagery according to imaging conditions, for example by acquiring imagery having narrow field patterns from both risley scanners in degraded visual environments to emphasize sensing capabilities in the direction of vehicle travel (flight). While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. An imaging system, comprising:
    a first risley sensor pointed along a first axis;
    a second risley sensor pointed along a second axis and intersecting the first axis, wherein the second risley sensor is configured to operate to acquire image data using a wide field of view when operating in a first mode and to acquire image data using a narrow field of view when operating in a second mode; and
    a controller operably connected to the second risley sensor and configured to:
        select one of the first and second modes of operation of the second risley sensor; and
        combine first image data from the first risley sensor, the first image data having a first pattern with a center, and second image data from the second risley sensor, the second image data having a second pattern with the same center, to construct an aggregated image having a third pattern with the same center.

2. The imaging system as recited in claim 1, wherein the first risley sensor and the second risley sensor are identical to one another.

3. The imaging system as recited in claim 1, wherein the first risley sensor includes first and second prisms with wedge angles arranged along the first axis, the wedge angle of the first prism being different than the wedge angle of the second prism.

4. The imaging system as recited in claim 3, wherein the second risley sensor includes first and second prisms with wedge angles arranged along the second axis, wherein the wedge angles of the second risley sensor prism are identical to the wedge angles of the first risley sensor prisms.

5. The imaging system as recited in claim 1, wherein the controller is configured to change rotational speed or reverse direction of a prism of the second risley sensor, the prism being supported for rotation about the second axis.

6. The imaging system as recited in claim 1, at least one of the first risley sensor and the second risley sensor includes an LIDAR system.

7. The imaging system as recited in claim 1, wherein the first pattern includes a first elliptical pattern.

8. The imaging system as recited in claim 7, wherein the second pattern includes a second elliptical pattern when operating in the first mode, the second elliptical pattern being identical to the first elliptical pattern.

9. The imaging system as recited in claim 7, wherein the second pattern includes a third elliptical pattern when operating in the second mode, the third elliptical pattern being different than the first elliptical pattern.

10. The imaging system as recited in claim 1, wherein the controller is configured to combine image data from the first and second risley sensors and construct a single image from the combined image data.

11. The imaging system as recited in claim 1, wherein the controller is configured to receive a wide field/narrow field selection input.

12. A vehicle, comprising an imaging system as recited in claim 1, wherein the first and second axes intersect in a direction of vehicle travel.

13. An imaging method, comprising:
    at an imaging system having a first risley sensor pointed along a first axis, a second risley sensor pointed along a second axis, the second axis intersecting the first axis, the second risley sensor being configured to acquire image data using a wide field of view when operating in a first mode and to acquire image data using a narrow field of view when operating in a second mode, controlling the second risley sensor to operate in a selected mode of one of the first and second modes;
    collecting first image data acquired by the first risley sensor, the first image data having a first pattern with a center;
    collecting second image data acquired by the second risley sensor, the second image data having a second pattern with the same center; and
    combining the first image data and the second image data to construct an aggregated image having a third pattern with the same center.

14. The imaging method as recited in claim 13, wherein changing between one of the first and second modes of operation of the second risley sensor and the other of the first and second modes of operation includes changing rotational speed of a prism supported for rotation about the second axis.

15. The imaging method as recited in claim 13, wherein changing between one of the first and second modes of operation of the second risley sensor and the other of the first and second modes of operation includes reversing rotational speed of a prism supported for rotation about the second axis.

16. The imaging method as recited in claim 13, wherein the first pattern includes a first elliptical pattern.

17. The imaging method as recited in claim 16, wherein when operating in the first mode, the second pattern includes a second elliptical pattern, the first elliptical pattern being identical to the second elliptical pattern.

18. The imaging system as recited in claim 17, wherein when operating in the second mode, the second pattern includes a third elliptical pattern, the first elliptical pattern differing from the third elliptical pattern.

19. The imaging method as recited in claim 13, further comprising constructing a single image from the combined image data of image data acquired by each of the first and second risley sensors.

20. The imaging method as recited in claim 13, further comprising receiving a selection input for selecting the first or second modes of operation of the second risley sensor.

* * * * *